(12) United States Patent
Pechinko (10) Patent No.: US 12,183,149 B2
(45) Date of Patent: Dec. 31, 2024

(54) DROP CART WITH CASHBOX DATA READER ARRAY AND AUTONOMOUS DROP CART PROCESSING SYSTEM FOR AUTOMATED CASINO ACCOUNTING

(71) Applicant: JCM American Corporation, Las Vegas, NV (US)

(72) Inventor: Paul Pechinko, Las Vegas, NV (US)

(73) Assignee: JCM American Corporation, Las Vegas, NV (US)

( * ) Notice: Subject to any disclaimer, the term of this patent is extended or adjusted under 35 U.S.C. 154(b) by 0 days.

(21) Appl. No.: 18/601,937

(22) Filed: Mar. 11, 2024

(65) Prior Publication Data

US 2024/0212425 A1 Jun. 27, 2024

Related U.S. Application Data

(63) Continuation of application No. 17/249,112, filed on Feb. 19, 2021, now Pat. No. 11,908,266, and a continuation of application No. 16/927,628, filed on Jul. 13, 2020, now Pat. No. 11,928,922, which is a continuation of application No. 16/810,307, filed on Mar. 5, 2020, now Pat. No. 10,755,522.

(60) Provisional application No. 62/846,062, filed on May 10, 2019.

(51) Int. Cl.
| | | |
|---|---|---|
| *A63F 9/00* | (2006.01) | |
| *G06F 7/00* | (2006.01) | |
| *G07F 17/32* | (2006.01) | |
| *H05B 45/20* | (2020.01) | |
| *H05B 47/105* | (2020.01) | |
| *H05B 47/155* | (2020.01) | |
| *H05B 47/16* | (2020.01) | |
| *H05B 47/19* | (2020.01) | |
| *H04B 5/70* | (2024.01) | |

(52) U.S. Cl.
CPC ...... *G07F 17/3216* (2013.01); *G07F 17/3223* (2013.01); *G07F 17/3227* (2013.01); *G07F 17/3239* (2013.01); *G07F 17/3241* (2013.01); *H05B 45/20* (2020.01); *H05B 47/105* (2020.01); *H05B 47/155* (2020.01); *H05B 47/16* (2020.01); *H05B 47/19* (2020.01); *G07F 17/3255* (2013.01); *H04B 5/70* (2024.01)

(58) Field of Classification Search
CPC ............ G07F 17/3216; G07F 17/3223; G07F 17/3227; G07F 17/3239; G07F 17/3241; G07F 17/3255; H05B 45/20; H05B 47/105; H05B 47/155; H05B 47/16; H05B 47/19; H04B 5/70
USPC ................................ 463/1, 30; 700/213, 231
See application file for complete search history.

(56) References Cited

U.S. PATENT DOCUMENTS

2019/0360258 A1* 11/2019 Uemizo ................. G07D 11/16

* cited by examiner

*Primary Examiner* — Yolanda R Cumbess
(74) *Attorney, Agent, or Firm* — FisherBroyles, LLP; Rob L. Phillips (57) ABSTRACT

An autonomous drop cart processing system is described. The system is configured to communicably couple with a drop cart that includes an array of cashbox data readers configured to interface with cashbox data transmitters associated with cashboxes inserted into compartments of the drop cart. As a result of this construction, the autonomous drop cart processing system can remove contents of each cashbox on the drop cart without needing to remove the cashbox from the drop cart in order to read the data from the cashbox data transmitter.

20 Claims, 8 Drawing Sheets

DROP CART WITH CASHBOX DATA READER ARRAY AND AUTONOMOUS DROP CART PROCESSING SYSTEM FOR AUTOMATED CASINO ACCOUNTING

CROSS-REFERENCE TO RELATED APPLICATION

This application is a continuation of U.S. patent application Ser. No. 16/927,628, filed Jul. 13, 2020, which is a continuation of U.S. patent application Ser. No. 16/810,307, now U.S. Pat. No. 10,755,522, filed Mar. 5, 2020, which is a nonprovisional of and claims the benefit under 35 U.S.C. § 119(e) of U.S. Provisional Patent Application No. 62/846,062, filed May 10, 2019, the contents of all which are incorporated herein by reference as if fully disclosed herein.

TECHNICAL FIELD

Embodiments described herein relate to automated casino accounting systems and, in particular, to automated systems to facilitate collection, accounting, sorting, and bundling of currency notes and other documents inserted by players into electronic gaming machines in a casino gaming environment.

BACKGROUND

A casino is typically required by one or more regulatory bodies to maintain accurate records of all transactions (e.g., ticket in/ticket out transactions, player card transactions, cash or document deposits, and so on) initiated by or through an electronic gaming machine controlled by the casino. Conventionally, such records are communicated from an electronic gaming machine to a local or remote server approved by the regulatory body.

At a later time, physical documents (e.g., cash, tickets, and so on) received by the electronic gaming machine are manually collected by a casino employee. Specifically, the casino employee retrieves a locked "cashbox" from the electronic gaming machine and transports the locked cashbox on a locked cart to a secured location in the casino (a "counting room"). Space within a counting room is typically compact and can become quickly crowded with casino employees, drop carts awaiting counting, and accounting equipment.

Once in the counting room, another casino employee removes and unlocks the locked cashbox from the locked cart and extracts a stack of documents contained therein. Thereafter, the stack is counted and sorted to verify that all cash transactions reported by the electronic gaming machine exactly match electronic records. Thereafter, the emptied cashbox is relocked and placed on a locked cart to be reinserted into an electronic gaming machine by a casino employee.

However, the process of regularly collecting cashboxes, placing cashboxes onto a locked cart, transporting a full cart to a counting room, unlocking cashboxes, retrieving document stacks from unlocked cashboxes, processing (e.g., sorting, counting, and/or bundling) the retrieved document stacks, relocking empty cashboxes, and redistributing and reinserting locked empty cashboxes into electronic gaming machines is exceptionally time consuming and subject to human error.

In addition, a conventional casino counting room is typically large in total area and requires many full-time employees to receive and process drop carts in a time-efficient manner. As a result, conventional casino counting rooms require casino space that might otherwise be usable by the casino for other purposes, such as additional electronic gaming machines or for guest services (e.g., restaurants, shops, and the like). In addition, the cost associated with the employees required to operate a conventional casino counting room is often a high.

SUMMARY

Embodiments described herein are directed to an autonomous drop cart processing system. The system is configured to communicably couple with a drop cart that defines an array of compartments, each of which is configured to receive a cashbox. Each compartment of the drop cart includes a dedicated cashbox data reader configured to interface with a cashbox data transmitter. As a result of this construction, an autonomous drop cart processing system can remove contents of each cashbox on the drop cart by manipulating the position of one or more automation mechanisms without needing to remove the cashbox from the drop cart in order to read the data from the cashbox data transmitter.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference a system including (1) a cashbox drop cart configured for batch and/or parallel cashbox processing (a "drop cart") and (2) an autonomous drop cart processing system—typically housed in a casino counting room—for reading data from, and emptying, one or more cashboxes collected from one or more electronic gaming machines and transported to a casino counting room on the drop cart in a casino gaming environment.

For simplicity of description, many embodiments herein reference a "casino" as an example gaming industry entity in control of a casino gaming environment, although it is appreciated that this is merely one example. Similarly, for simplicity of description, the phrase "electronic gaming machine" as used herein is generally understood to refer to a stationary slot machine within a casino, however, it may be understood that this is merely one example of an electronic gaming machine or gaming service. In other words, in some embodiments, other gaming industry entities and/or other stationary, portable, and/or digital (e.g., software-based) electronic gaming machines and/or services may be suitable for use with the various embodiments described herein and equivalents thereof.

For embodiments described herein, a drop cart and an autonomous drop cart processing system are communicably coupled and configured to, without limitation: extract data from each cashbox disposed on the drop cart; unlock each cashbox disposed on the drop cart; open a door of each cashbox disposed on the drop cart; retrieve document stacks (e.g., stack(s) of documents, casino vouchers, and the like); jog and/or otherwise sort or organize the retrieved document stacks; close the door of each cashbox disposed on the drop cart; relock each cashbox disposed on the drop cart; and send a signal to each locked cashbox and/or a casino system (e.g., accounting system) that a relocked cashbox on the drop cart is empty and ready for reinstallation in an electronic gaming machine.

As a result of the architectures described herein, a batch of cashboxes disposed on a drop cart (such as described herein) can be processed as a group or in a batch by an autonomous drop cart processing system without requiring the time-consuming traditional operations of removing cashboxes from a conventional drop cart, positioning removed cashboxes onto a cashbox data reading dock, emptying said cashboxes, repositioning empty cashboxes onto another drop cart, and so on. In a simpler non-limiting phrasing, the embodiments described herein enable the rapid and efficient processing of a set, group, or batch of cashboxes while those cashboxes remain on a drop cart, such as described herein.

In this manner, the various systems and methods described herein substantially automate the operations of processing cash and other documents received and stored in cashboxes collected from one or more electronic gaming machines or gaming services (e.g., slot machines, table games, and so on) associated with a casino gaming environment. As a result, the costs and complexities associated with operating a traditional casino counting room—including employment of a full-time staff of multiple highly-trained employees—can be reduced. Further, physical space in a casino reserved for a conventional counting room can be reclaimed for other purposes (e.g., additional floor space, guest services space, and the like), because an autonomous drop cart processing system, such as described herein, requires substantially less physical space than a conventional counting room. Further still, an autonomous drop cart processing system and drop cart, such as described herein, can be less expensive to operate continuously and can be substantially faster than a traditional team of casino counting room employees. As a result, a casino implementing the systems described herein can reclaim counting room space, reduce operational costs, decrease a mean time for processing cashboxes, reduce a number of auxiliary cashboxes required by the casino to reinstall in electronic gaming machines while other cashboxes are being processed, reassign highly skilled employees to other responsibilities, reduce counting room error rates (thereby potentially reducing insurance rates and/or premiums), reduce downtime of electronic gaming machines (thereby increasing average gameplay time and casino revenues), and so on. Further, an autonomous drop cart processing system, such as described herein, can dramatically decrease the risk of fraud or theft by casino employees or contractors tasked with money handling.

A drop cart—such as described herein—is a movable storage rack, trolley, or other movable compartment, cage, cabinet, or locker used by a casino employee to store and securely transport a number of cashboxes collected from a number of electronic gaming machines, to a counting room or other secure location of a casino. The drop cart may include a frame that typically takes the shape of a rectangular prism, one or more sides of which define a number of compartments or alignment regions into which individual cashboxes can be inserted. The drop cart is movable by wheels or casters that support the frame, which may be powered or unpowered. Other drop cart frames can be implemented with different shapes, including cylindrical or drum shapes, cubic shapes, and the like.

The compartments defined, at least in part, by the frame of the drop cart may be enclosed, lockable, open, or defined by guide walls or other alignment features to encourage alignment of cashboxes into predefined positions when inserted into the drop cart. The compartments, in many examples, can include retaining and release features that substantially secure a cashbox once inserted. Example retaining and release features include, but are not limited to: push-push mechanisms; latch mechanisms; detent mechanisms; and so on.

In many examples, although not required, the compartments of a drop cart such as described herein are arranged in rows, each defining a number of discrete compartments into each of which a respective one cashbox can be inserted. However, these foregoing examples are not exhaustive and other drop carts can organize compartments in a different manner (e.g., by columns, in a particular pattern, in a magazine or other feeding or queuing device, and so on).

In many embodiments, a drop cart, such as described herein, includes an array of cashbox data readers, each of which is positioned relative to a single compartment of the drop cart. For embodiments described herein, each cashbox data reader is configured to retrieve information stored in a memory of a respective cashbox. As a result of this construction, information from each cashbox disposed on a drop cart, such as described herein, can be read substantially simultaneously and/or in batches. In many cases, the cashbox data reader(s) of a drop cart, such as described herein, can begin reading information from a cashbox immediately and/or shortly after that cashbox is inserted into a compartment of the drop cart. In other cases, the cashbox data reader(s) of a drop cart, such as described herein, can begin reading information from cashboxes as the drop cart is transported within the casino.

The operation(s) associated with reading information and/or data from each cashbox inserted into compartments of a drop cart—such as described herein—can be performed autonomously by a processor or other circuitry of the drop cart or, in certain embodiments, can be performed or otherwise triggered by a casino employee interacting with a human input device interface provided by, or otherwise associated with, the drop cart. As a result of these constructions, the system can record and associate a timestamp (and/or other data) with each cashbox on each cashbox cart at each moment the cashbox is handled, either automatically or manually, thereby automatically establishing a chain of custody of each cashbox (and, correspondingly, each banknote and each document in each cashbox) from an electronic gaming machine to a counting room.

For example, the drop cart can include one or more buttons or user interface components (e.g., touch screens, dials, button pads, number pads, keyboards, or other inputs) the casino employee can interact with and provide input to in order to begin the operation(s) of reading one or more cashboxes disposed on the drop cart.

In other examples, the casino employee can operate a portable electronic device (e.g., cellular phone, tablet device, smart watch, handheld scanner or data input device, and so on) separate from the drop cart that is communicably coupled to the drop cart. In other words, the portable electronic device can send one or more signals to the drop cart—via a wireless or wired connection—that trigger the drop cart to operate one or more cashbox data readers to obtain data or information from one or more cashboxes inserted into the drop cart.

These foregoing examples are not exhaustive. To the contrary, it is understood that any number of suitable communication techniques and circuit topologies can be selected for a particular implementation of the embodiments described herein to perform the operation(s) of obtaining information from cashboxes when, or otherwise while, those cashboxes are disposed on a drop cart.

Similarly, it is understood that any suitable information can be communicated between cashboxes and a cashbox data reader, such as described herein. The information obtained from a cashbox typically corresponds to accounting information related to documents within the cashbox and/or identifying information related to an electronic gaming machine from which the cashbox was retrieved, and so on, although this is not required. Other information includes, but is not limited to: a unique identifier associated with the cashbox; a unique identifier or address associated with the electronic gaming machine from which the cashbox was retrieved; a listing of all documents contained in the cashbox; a set of images of each document in the cashbox; a count of documents in the cashbox; a sum total of currency notes within the cashbox; and so on. It may be appreciated that these examples are not exhaustive and that any suitable information can be communicated between a cashbox and a cashbox data reader, such as described herein.

For simplicity of description and illustration, the term "cashbox data transmitter" is used herein to collectively refer to the passive and/or active circuits and/or physical structures of a particular cashbox configured to communicate information to a cashbox data reader of a drop cart such as described herein. Example cashbox data transmitters include, but are not limited to: near field communications radios; near field communication tags; radio frequency identification radios; radio frequency identification tags; physical contacts (e.g., pogo pins, flat contacts, standardized or proprietary contacts) coupled to an electronic circuit within a cashbox; Bluetooth communications circuitry; Wi-Fi communications circuitry; infrared communication circuitry; Ethernet communications circuitry; any other wired or wireless communication circuitry implementing a standardized or proprietary communications protocol; and so on.

In some examples, the cashbox data readers of a drop cart conductively couple to one or more electrodes or data ports of a cashbox data transmitter. In other examples, the cashbox data readers and cashbox data transmitters are wireless and contactless. An example implementation of a drop cart includes a compartment with a cashbox data reader including a near field communications radio configured to communicably couple to a cashbox data transmitter including a near field communications radio. It may be appreciated that the relative positioning of a cashbox data reader—and/or portions thereof, such as an electrical contact or a wireless antenna—depends upon, among other things, the geometry of a particular cashbox and the cashbox data transmitter of that cashbox. In some cases, a single compartment of a drop cart, such as described herein, includes multiple cashbox data readers; each disposed in different locations and/or configured to transact data with different cashbox data transmitters. In other words, it is appreciated that a single compartment of a drop cart, such as described herein, can include any number of cashbox data readers that can be configured to communicate with any number of cashbox data transmitters, using the same or different technologies.

As noted above, it may be appreciated that these foregoing examples are not exhaustive and that any suitable communication technique or data extraction technology can be used by a cashbox data reader, such as described herein, in order to obtain data from a cashbox data transmitter of a cashbox inserted into a particular compartment of a drop cart, such as described herein. For example, a cashbox data reader can be configured to support multiple communication protocols and/or multiple techniques of obtaining data from a cashbox data transmitter; for simplicity of description, the embodiments that follow reference cashbox data readers configured to extract data from a single type of cashbox using a single communication(s) technology, but it may be appreciated that this is merely one example and that other cashbox data readers and/or drop carts can be configured in a different manner.

In addition to the cashbox data readers described above, a drop cart such as described herein further includes a controller or processor communicably coupled to each cashbox data reader, a memory, a power source (e.g., a battery) and a wireless or wired network communication subsystem (e.g., Bluetooth, Wi-Fi, Ethernet, infrared, and the like). As a result of this construction, and as a result of the alignment encouraged by the geometry and structure of each compartment, cashbox data can be read immediately (or at any other suitable time) once a cashbox is inserted into a compartment of the drop cart.

In another non-limiting phrasing, for embodiments described herein, the drop cart itself can retrieve, backup, and/or transmit (to one or more casino accounting systems or another system), cashbox data before the drop cart arrives at a counting room. It may be appreciated these embodiments dramatically increase the speed at which data can be extracted from a set, group, or batch of cashboxes and consumed by or otherwise received by a casino accounting system.

Once at least one cashbox ready for processing is inserted into a compartment of a drop cart, such as described herein, the drop cart can be navigated by a casino employee to a counting room that houses an autonomous drop cart processing system, such as described herein.

An autonomous drop cart processing system can be configured to, without substantial intervention by a human operator: receive a drop cart of locked cashboxes; fix and/or otherwise lock the drop cart in place; unlock each locked cashbox on the drop cart while leaving each cashbox on the drop cart; open each unlocked door of each cashbox; retrieve document stacks from the unlocked cashboxes; process the retrieved documents (e.g., by sorting, counting, reconciling, and/or bundling); close each unlocked door of each cashbox; and relock the emptied cashboxes. Thereafter, the emptied and relocked cashboxes can be re-inserted into an electronic gaming machine by a casino employee. In some embodiments, the autonomous drop cart processing system can be further configured to organize the retrieved and/or bundled document stacks by denomination or in any other suitable manner, for example in preparation for collection and deposit at a bank. In some cases, the autonomous drop cart processing system can be configured to insert identification cards or other data processing flags into document stacks, such as header cards or trailer/footer cards.

To perform these operations, an autonomous drop cart processing system, such as described herein, typically includes one or more articulated, delta, or Cartesian coordinate robots (collectively, "automation mechanisms") communicably coupled to a controller that can adjust the position or pose of the robots across one or more degrees of freedom in free space. In many embodiments, one or more components of the controller can include, or can be communicably coupled to, circuitry and/or logic components, such as a processor and a memory. The processor of the controller can be implemented as any device capable of processing, receiving, or transmitting data or instructions. For example, the processor can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor. In some embodiments, the processor may be configured to operate as a programmable logic controller.

Accordingly, as described herein, the term "processing unit" or, more generally, "processor" or "controller" refers to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

In one embodiment, an autonomous drop cart processing system includes a first automation mechanism fitted with a key attachment can manipulate the position or pose of the key attachment to locate (e.g., via computer vision, a fixed location, and so on) and unlock one or more locked doors of the selected cashbox. In these examples, a controller of the drop cart can communicably couple to the controller of the autonomous drop cart processing system in order to communicate the cashbox information communicated from the cashbox data transmitter of the selected cashbox to the cashbox data reader of the compartment of the drop cart into which the selected cashbox is positioned.

In some embodiments, the first automation mechanism is a Cartesian-coordinate robot configured to move in plane with an external surface of the drop cart, whereas in other cases, the first automation mechanism is a delta robot or an articulated robot. It may be appreciated that any suitable mechanism configured to locate a lock of a cashbox, insert a key into the located lock, manipulate the key to unlock the lock, and (optionally) to adjust its own position or pose to pivotably manipulate the door of the selected cashbox in order to expose the contents thereof. In some embodiments, the first automation mechanism can be further configured to re-lock the locking mechanism of the door of the selected cashbox, while that door is open, so that the first automation mechanism can advance to select and unlock another cashbox, while leaving the door of the first cashbox open and its contents accessible to other mechanism(s) of the automated drop cart handling.

Thereafter, in some embodiments, once the content of one or more selected cashboxes on the drop cart are accessible (e.g., the door to said cashbox(es) are opened, whether the lock to those cashbox(es) are locked or unlocked), another automation mechanism fitted with a grasping attachment (e.g., clamp, finger mechanism, suction mechanism, pincer, and the like) can locate, grip, and withdraw a document stack disposed within the unlocked cashbox. In many examples, the gripper can include one or more features to support stack of documents, preventing the stack from drooping or otherwise collapsing when removed from the unlocked cashbox by the second automation mechanism.

Thereafter, the second automation mechanism can place the withdrawn stack of documents into a document sorting mechanism, a jogging mechanism, a document counting mechanism, a document binding or bundling mechanism, or any other suitable mechanism or compartment. In some cases, the second automation mechanism can be configured to convey the stack of documents from one mechanism to another. For example, the second automation mechanism can be configure to withdraw the stack of documents from the unlocked cashbox, position the stack of documents in a hopper of a document counting mechanism, grasp the stack of documents once counted by the document counting mechanism, position the counted stack of documents in a hopper of a document sorting mechanism, grasp at least one sorted stack of counted documents, position the at least one sorted stack of counted documents into hopper of a document binding mechanism, and so on.

Thereafter, once the unlocked cashbox is emptied of documents by the second automation mechanism, the first and second automation mechanisms can be manipulated by the controller to close the open door of the cashbox and relock the cashbox, while the cashbox remains on the drop cart.

Once all cashboxes on the drop cart are processed, and all content therefrom is removed, the drop cart itself can be released from any anchoring mechanism holding the drop cart in place relative to the first, second, or any other mechanism of the autonomous drop cart processing system, and a notification signal can be sent to a casino employee to move the drop cart so that another drop cart can be processed and/or to remove the drop cart to reinstall the empty cashboxes into electronic gaming machines on the casino.

In some cases, the autonomous drop cart processing system can include a floor track or other guide configured to receive drop carts for processing. The floor track can include one or more anchor points or retaining structures that secure a drop cart in place and/or move a drop cart into place while the various automation mechanisms of the autonomous drop cart processing system process each cashbox on the drop cart. In some cases, the floor track can be configured to move a drop cart at a continuous pace while one or more automation mechanisms of the autonomous drop cart processing system move along with the drop cart. In this manner, in a simpler phrasing, an autonomous drop cart processing system, such as described herein, can be configured as a continuous processing line receiving an input of one or more drop carts with a number of cashboxes ready for processing and producing an output of one or more drop carts including only empty cashboxes suitable for reinstallation in electronic gaming machines.

It is appreciated that the foregoing and following examples are not exhaustive of the various possible implementations of embodiments described herein and equivalents thereof.

These and other embodiments are discussed below with reference to FIGS. 1-7. However, those skilled in the art will readily appreciate that the detailed description given herein with respect to these figures is for explanatory purposes only and should not be construed as limiting.

Figure 1:
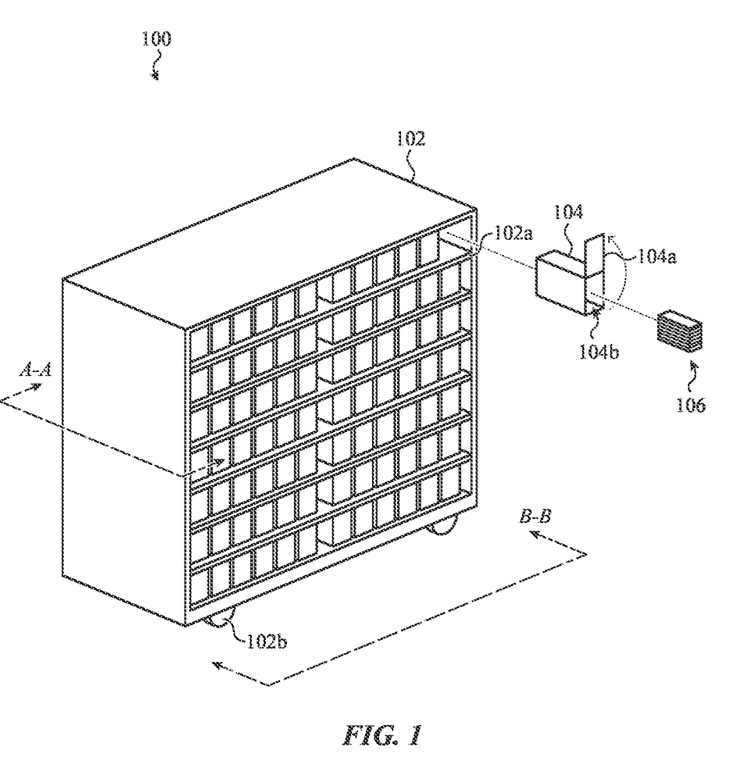
FIG. 1 depicts a drop cart for use in a casino gaming environment, such as described herein.

FIG. 1 depicts a drop cart for use in a casino gaming environment, such as described herein. As noted with respect to other embodiments described herein, the drop cart 100 is a movable storage rack, trolley, or other movable compartment, cage, cabinet, or locker used by a casino employee to store and securely transport a number of cashboxes collected from a number of electronic gaming machines, to a counting room or other secure location of a casino. The drop cart 100 is configured to store and collect information from an array of cash boxes that can be inserted into compartments of the drop cart 100. In this manner, the drop cart 100 is configured to be processed with an autonomous drop cart processing system, such as described herein. For simplicity of illustration, the autonomous drop cart processing system is not shown in FIG. 1.

The drop cart 100 includes a housing frame 102 that supports and encloses the various components and structures of the drop cart 100. The housing frame 102 can be made from a number of suitable materials including, but not limited to: metal; fiberglass; plastic; acrylic; wood; and so on. In many cases, the housing frame 102 is made from a material that is transparent to radio signals, although this may not be required of all embodiments.

As illustrated, the housing frame 102 takes the shape of a rectangular prism, one or more sides of which define a number of compartments or alignment regions into which individual cashboxes can be inserted. For purposes of illustration, one cashbox is identified as the cashbox 104 and is aligned with a compartment identified as the compartment 102a. The drop cart is movable by wheels or casters that support the frame (one of which is identified as the wheel 102b), which may be powered or unpowered. As noted above, other drop cart frames or housings can be implemented with different shapes, including cylindrical or drum shapes, cubic shapes, and the like.

The compartments of the drop cart 100 defined by the housing frame 102 can be disposed in any suitable pattern. In the illustrated embodiment, the housing frame 102 defines seven rows of cashbox compartments, each of which is configured to receive twelve independent cashboxes. In many cases, the drop cart 100 can be configured to receive cashboxes on two sides thereof, thereby defining two discrete arrays of compartments configured to receive eighty four independent cashboxes; in the illustrated embodiment is may be understood that only a single side of the housing frame 102 and drop cart 100 is visible. It is understood that a second array of compartments may be defined on the side of the housing frame 102 opposite the depicted array.

In further embodiments, the housing frame 102 can define another pattern of compartments that may include a greater or smaller number of rows or individual compartments. It is appreciated that the depicted construction is merely one example.

The cashbox 104 includes a lockable lid 104a that encloses an internal volume 104b into which a stack of documents 106 can be stored. As noted above and with respect to other embodiments described herein, the stack of documents 106 can be a stack of banknotes, bills, cash, vouchers, receipts, tax forms, or any other suitable document.

The cashbox 104 can be formed in a number of suitable shapes and sizes. In the illustrated embodiment, a rectangular prims is shown, but is it appreciated that in other embodiments, the cashbox 104 can take other shapes.

Similarly, it is appreciated that the compartment 102a of the housing frame 102 is sized to receive the cashbox 104. In this manner, the size and shape of the compartment 102a is understood to be complementary to the size and shape of the cashbox 104.

As noted above with respect to other embodiments described herein, the cashbox 104 also includes electronic components, such as a controller, a memory, and a communications module including a cashbox data transmitter. For simplicity of illustration these elements are not shown in FIG. 1. The cashbox data transmitter of the cashbox 104 can be configured to communicably couple with a cashbox data receiver disposed in the compartment 102a of the drop cart 100. In this manner, and as a result of this alignment and construction, data or information stored in a memory of the cashbox 104, such as data corresponding to the stack of documents 106 (e.g., count of documents, total currency value, serial numbers of each document, and so on) can be communicated to the drop cart 100.

More specifically, as noted above and with respect to other embodiments described herein, the drop cart 100 can include one or more electronic components configured to perform or coordinate one or more operations of the drop cart 100. For example, the drop cart 100 can include a memory, a processor, and an array of cashbox data receivers. The drop cart 100 can also include a replenishable power supply, such as a rechargeable battery, configured to provide electrical power to each of the electronic and/or electromechanical components of the drop cart 100.

In many embodiments, each of the cashbox data receivers of the array of cashbox data receivers of the drop cart 100 can be communicably coupled to the processor of the drop cart 100 such that data received from any one of the cashbox data receivers can be processed by the processor (e.g., formatted, converted, decrypted, and so on) and stored in a memory of the drop cart 100. As noted above, the drop cart 100 can also include one or more sensors configured to detect insertion of a cashbox into a particular compartment, such as insertion of the cashbox 105 into the compartment 102a. Example sensors include, but are not limited to: pushbutton switches; magnetic reed switches; photo interrupters; capacitive sensors; and so on. In other examples, the drop cart 100 can include a human interface device, such as a touch screen or a button, which can be used by a casino employee to provide input to the drop cart 100. Such input can include an indication that a cashbox has been inserted into a compartment of the drop cart 100.

It may be appreciated that the foregoing description of FIG. 1, and the various alternatives thereof and variations thereto, are presented, generally, for purposes of explanation, and to facilitate a thorough understanding of the structure and general function of a drop cart, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Figure 2A:
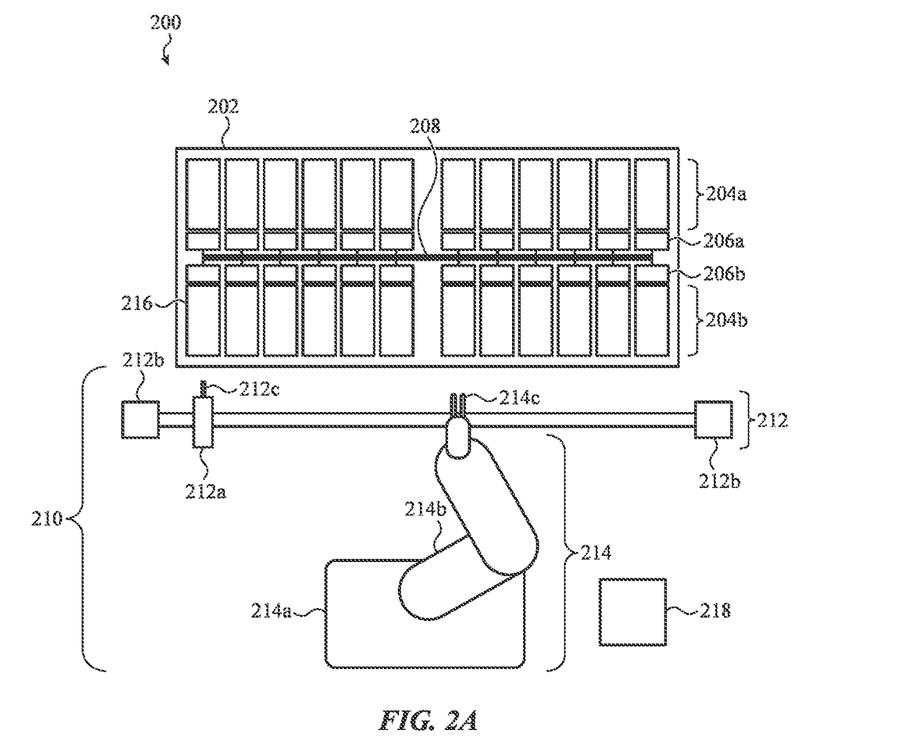
FIG. 2A depicts a top plan view of a drop cart including an integrated cashbox reader array, received in a compact counting room such as described herein.
Figure 2B:
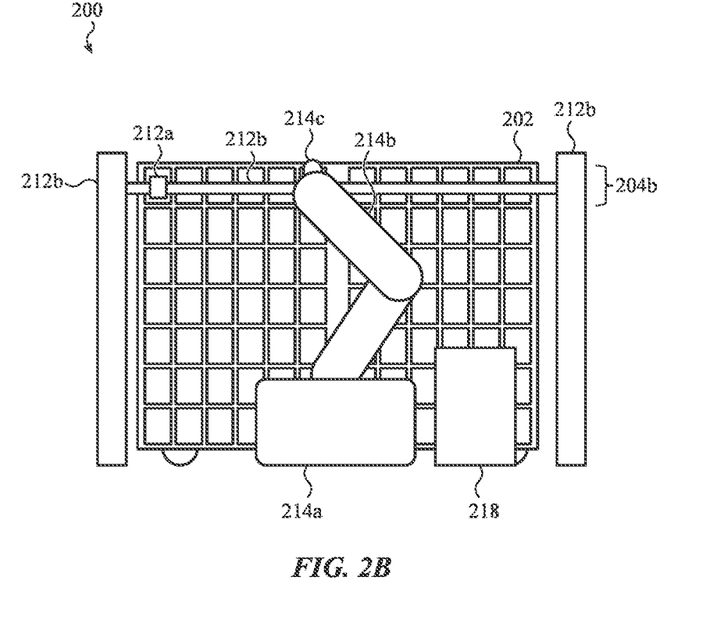
FIG. 2B depicts a front plan view of the drop cart and compact counting room of FIG. 2A.

For example, generally and broadly, FIGS. 2A-2B depict the drop cart of FIG. 1, viewed through lines A-A and B-B respectively. In addition, these figures depict an autonomous drop cart processing system that can be configured to process each cashbox inserted into the various compartments of the drop cart 100 without removing said cashboxes from the drop cart.

FIGS. 2A-2B depicts a top and front plan view of the drop cart of FIG. 1 viewed from lines A-A and B-B, respectively. In the illustrated embodiment, the drop cart 200 includes the housing frame 202. Similar to FIG. 1, the housing frame 202 defines a number of compartments arranged as a grid and configured to receive a number of cashboxes. In the illustrated embodiment, two separated arrays of compartments 204a, 204b are positioned opposite one another along a length of the housing frame 202. As with other embodiments described herein, each compartment of the arrays of compartments 204a, 204b is associated with at least one respective cashbox data reader, two of which are identified as the cashbox data readers 206a, 206b. As with other embodiments described herein, the cashbox data readers of the drop cart 200 are typically communicably coupled to a controller of the drop cart 200, for example via a communication bus 208. As a result of this architecture, whenever a cashbox is inserted into a compartment of the drop cart 200, a respective one cashbox data reader can read data or information from the inserted cashbox. Thereafter, the cashbox data reader can communicate the received information to the controller (or another circuit) of the drop cart 200 to be stored in a memory and/or communicated via a wireless or wired data channel to another system or network, such as a casino accounting system.

As noted with respect to other embodiments described herein, each cashbox inserted into the various compartments of the drop cart 200 can be processed by an autonomous drop cart processing system 210. More specifically, the autonomous drop cart processing system 210 is configured to extract a stack of documents from each cashbox inserted into the drop cart 200 while the cashbox is on the drop cart 200. In this manner, as described above, the autonomous drop cart processing system 210 enables a substantial increase in processing speed of a batch, group, or set of cashboxes.

In particular, in the illustrated embodiment, the autonomous drop cart processing system 210 includes a first automation mechanism 212 also referred to as an access control robot.

The first automation mechanism 212 of the autonomous drop cart processing system 210 of the illustrated embodiment is implemented as a Cartesian-coordinate robot configured to shift a position of a locking attachment 212a (also referred to as a key attachment) relative to the array(s) of compartments of the drop cart 200.

More particularly, the first automation mechanism 212 of the autonomous drop cart processing system 210 is supported by a vertical frame 212b and is configured to translate in a linear and vertical direction in order to align the locking attachment 212a—and in particular a key extension 212c coupled to an extending actuation portion of the locking attachment 212a—with a keyhole of a selected cashbox inserted into the drop cart 200. As described with respect to other embodiments described herein, the first automation mechanism 212 is configured to not only unlock a selected cashbox (or, in other embodiments include more than one locking attachment 212a and more than one key extension 212c) but also to open a door to each cashbox once the door to said cashbox (e.g., the cashbox 216) is unlocked.

In other embodiments, only a single automation mechanism may be required. In such implementations, the automation mechanism can be configured to access and couple to multiple discrete attachments (e.g., a locking attachment, a key extension, a grasping mechanism, and so on).

The autonomous drop cart processing system 210 also includes a second automation mechanism 214, also referred to as a document processing robot. In the illustrated embodiment, the second automation mechanism 214 of the autonomous drop cart processing system 210 is implemented as an articulated robot include a base 214a that supports a movable mechanical arm 214b. The movable mechanical arm 214b of the autonomous drop cart processing system 210 is configured to position a grasping attachment 214c coupled to the movable mechanical arm 214b in free space in order to extract a stack of documents from an unlocked cashbox whose door is open.

As a result of this construction, when the drop cart 200 is navigated into position adjacent to the autonomous drop cart processing system 210, the drop cart 200 can be anchored in place. After the drop cart 100 is anchored in place, the first automation mechanism 212 can manipulate and reposition the key extension 212c to iteratively unlock and open each cashbox on the side of the drop cart 200 facing the autonomous drop cart processing system 210.

Once at least one cashbox (e.g., the cashbox 216) inserted into the drop cart 200 is unlocked and opened, the second automation mechanism 214 can manipulate and reposition the grasping attachment 214c in order to withdraw a stack of documents from the selected cashbox. Thereafter, the withdrawn stack of documents can be positioned into a collection station 218. The collection station 218 can include one or more of, without limitation: a document jogger; a document sorter; a document counter; a document banding system; and the like.

Once each cart of a single side of the drop cart 200 has been processed, a notification or signal may be sent to a casino employee to reverse the position of the drop cart relative to the autonomous drop cart processing system 210. In other cases, more than one autonomous drop cart processing system 210 can be included; in these examples, a drop cart—such as the drop cart 200—can be positioned between two autonomous drop cart processing systems such as described herein.

It may be appreciated that the foregoing description of FIGS. 2A-2B, and the various alternatives thereof and variations thereto, are presented, generally, for purposes of explanation, and to facilitate a thorough understanding of various possible configurations of a drop cart, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Figure 3:
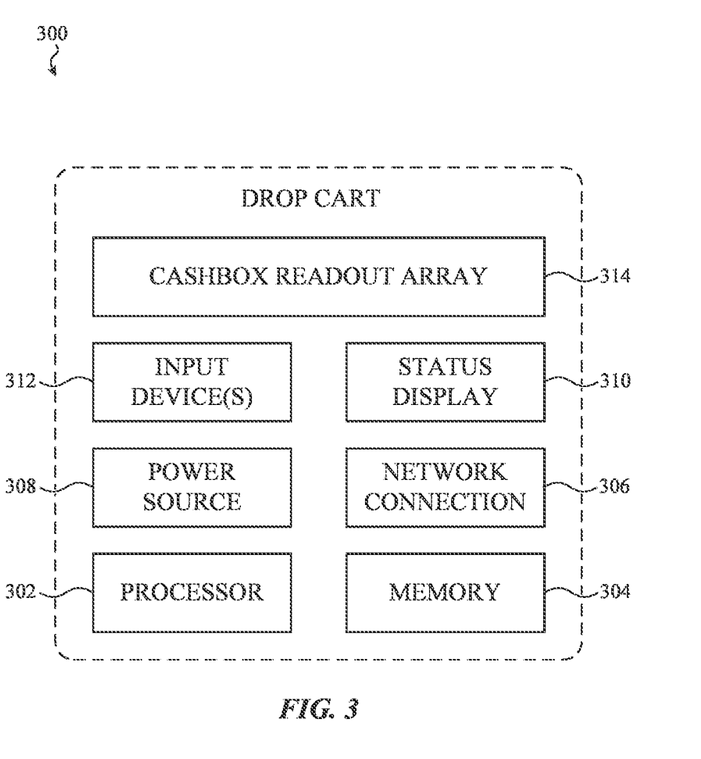
FIG. 3 depicts a simplified system diagram of a drop cart including an integrated cashbox reader array, such as described herein.

FIG. 3 depicts a simplified system diagram of a drop cart including a cashbox reader array, such as described herein. In particular, the drop cart 300 includes a processor 302, a memory 304, a network connection 306, a power source 308, an optional status display 310, one or more optional input devices 312, and a cashbox data reader array 314.

The processor 302 of the drop cart 300 can be any suitable processor or processing device and is configured to perform, coordinate, supervise, and/or schedule one or more tasks or operations of the drop cart 300. In many examples, the processor 302 is configured to communicably couple to the memory 304 to access one or more executable program instructions to perform one or more tasks or operations.

For example, the processor 302 may be configured to access the memory 304 in order to perform the operation(s) of obtaining and/or processing information or data from one or more cashboxes. In particular, the processor 302 can be configured to communicably couple to at least one cashbox data reader of the cashbox data reader array 314 to receive information or data corresponding to a cashbox inserted into the drop cart 300. Thereafter, the processor 302 can be configured to process, reformat, consume, and/or otherwise utilize the information received from the inserted cashbox.

In other cases, the processor 302 can be configured to store all or some of the data received from an inserted cashbox in the memory 304. In other cases, the processor 302 can be configured to transmit some or all of the data or information received from an inserted cashbox to another system, such as a casino accounting system or an autonomous drop cart processing system, such as described herein. In order to communicate information to another system and/or to an autonomous drop cart processing system, the processor 302 can leverage the network connection 306, which can be a wired or wireless connection.

As with other embodiments described herein, the drop cart 300 can receive electrical power from an internal power source, such as the power source 308. Example power sources include but are not limited to: battery power sources; solar power sources; capacitive power sources; and the like and so on. The power source 308 can include one or more recharging circuits. It may be appreciated that these foregoing examples are not exhaustive of all types of power sources that may be leveraged by a drop cart, such as described herein.

The drop cart 300 can also include an optional status display 310 and/or one or more optional input devices 312 of the drop cart 300. The status display(s) of the drop cart 300 can be configured to provide a visual, audio, haptic, or other indication to a casino employee in control of the drop cart 300 of one or more state changes of the drop cart 300 or of a cashbox inserted into the drop cart 300. For example, a status display of the drop cart 300 can indicate to a casino employee, without limitation: whether a cashbox is properly seated in a compartment of the drop cart; whether a cashbox requires emptying; whether a cashbox is empty or full; whether reading data from a cashbox succeeded or failed; a power level of the power source 308; and the like and so on.

It may be appreciated that the foregoing description of FIG. 3, and the various alternatives thereof and variations thereto, are presented, generally, for purposes of explanation, and to facilitate a thorough understanding of various possible configurations of control electronics associated with a drop cart, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Figure 4:
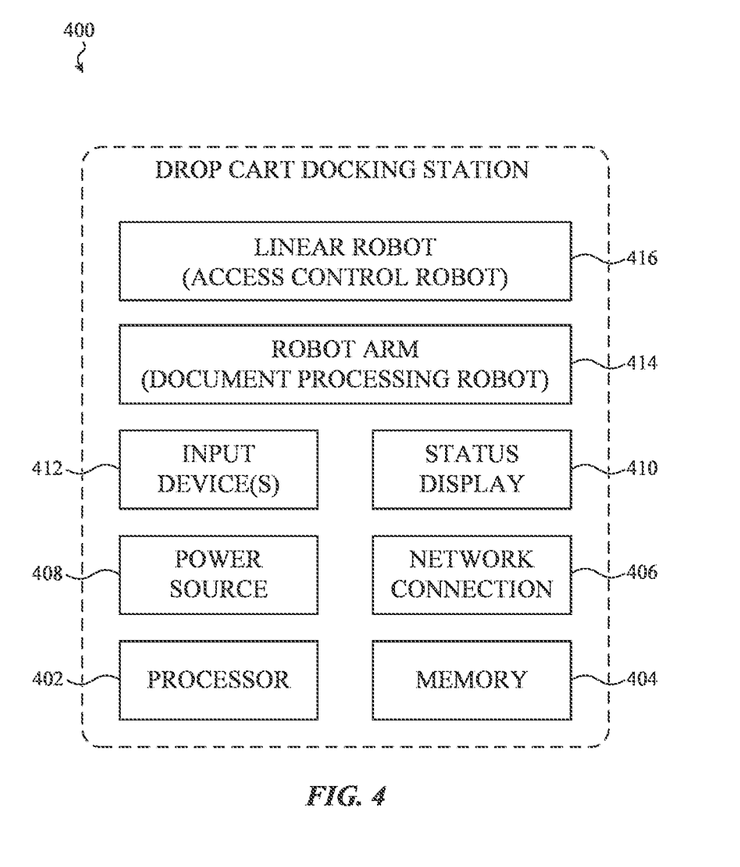
FIG. 4 depicts a simplified system diagram of an autonomous drop cart processing system, such as described herein.

FIG. 4 depicts a simplified system diagram of an autonomous drop cart processing system, such as described herein. The autonomous drop cart processing system 400 includes a processor 402 (also referred to as a controller), a memory 404, a network connection 406, a power source 408, an optional status display 410, an optional input device 412, and two automation mechanisms identified as the document processing robot 414 (also referred to as a robot arm), and an access control robot 416 (also referred to as a linear robot).

As with other embodiments described herein, it may be appreciated that the processor 402, the memory 404, the network connection 406, the power source 408, the status display 410, and the input device 412 can be configured and implemented in a similar manner as describe above with respect to FIG. 3 and other embodiments; this description is not repeated. In addition, the first and second automation mechanisms identified as the document processing robot 414 (also referred to as a robot arm) and the access control robot 416 (also referred to as a linear robot) can be configured in the same manner as described above and with respect to other embodiments, this description is not repeated.

It may be appreciated that the foregoing description of FIG. 4, and the various alternatives thereof and variations thereto, are presented, generally, for purposes of explanation, and to facilitate a thorough understanding of various possible configurations of control electronics associated with an autonomous drop cart processing system, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Figure 5:
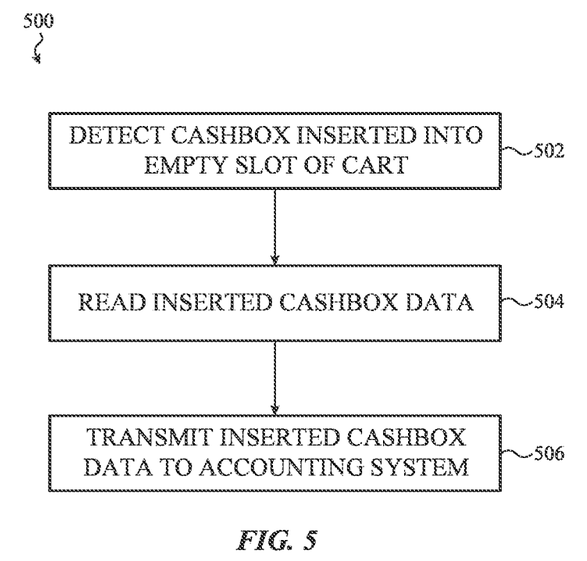
FIG. 5 depicts example operations of a method of operating a drop cart, such as described herein.
Figure 6:
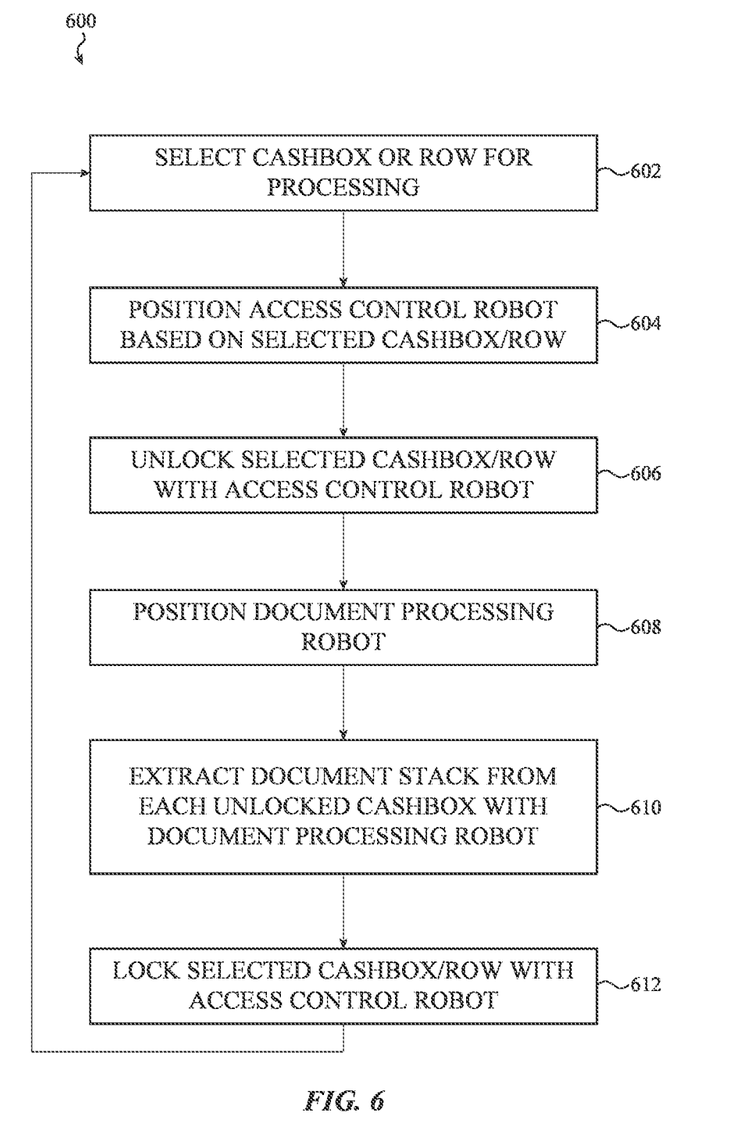
FIG. 6 depicts example operations of a method of operating an autonomous drop cart processing system, such as described herein.
Figure 7:
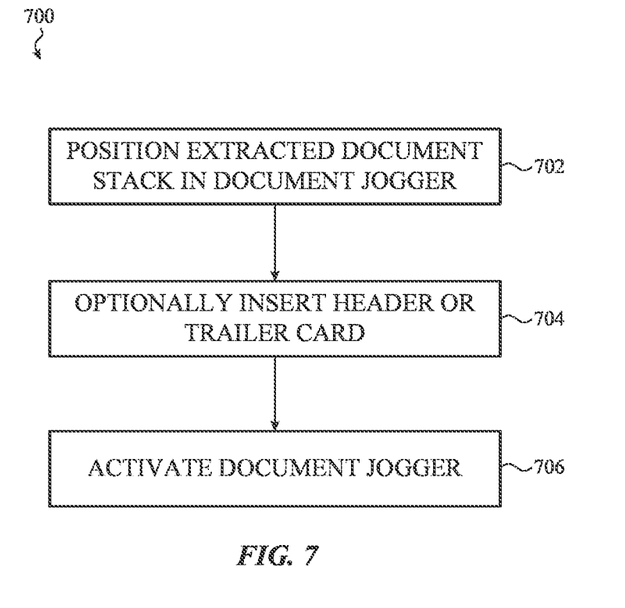
FIG. 7 depicts example operations of a method of operating an autonomous drop cart processing system, such as described herein.

Generally and broadly, FIGS. 5-7 depict example operations of methods of operating an autonomous drop cart processing system, such as described herein.

For example, FIG. 5 depicts example operations of a method of operating a drop cart, such as described herein. These operations can be performed, in whole or in part, by a processor or other controller of a drop cart, such as described herein (see, e.g., FIGS. 1-3). In some cases, one or more operations of the method 500 can be carried out, in whole or in part, in software executed by a processor or controller of a drop cart, such as described herein.

The method 500 includes operation 502 in which a drop cart processor, circuit, or other electronic component detects insertion of a cashbox into an empty slot or compartment of the drop cart. The detection performed at operation 502 can be performed in a number of suitable ways with any suitable electronic hardware. For example, in some examples, the drop cart includes an electronic switch that can be actuated by insertion of a cash box. In other cases, the drop cart can include an optical break detection system include a photodetector and a photoemitter. In these examples, when the optical path between the photodetector and the photoemitter is interrupted, the drop cart can determine that a cashbox has been inserted.

In still further examples, the drop cart can include one or more input components such as buttons or a touch-sensitive screen. A casino employee can operate one of these input components to inform the controller of the drop cart that a cashbox has been inserted. The foregoing examples are not exhaustive and it may be appreciated that any suitable means of detecting or indicating insertion of a cashbox into a compartment of a drop cart, such as described herein, can be used.

The method 500 also includes operation 504 in which a controller of the drop cart operates a cashbox data reader to read data from the cashbox that was inserted into the drop cart. As noted with respect to other embodiments described herein, the cashbox data reader can leverage any suitable technology to read data from the cashbox. In some cases, the drop cart and/or the cashbox data reader can select a particular technology among a set of available technologies in order to read a particular cashbox. For example, a drop cart may be configured to read data from three types of cashboxes. In these examples, the controller of the drop cart may be configured to iteratively test each of a set of three different cashbox data reader technologies (e.g., different physical hardware, different communication protocols and so on) until data is obtained from the cashbox inserted into the drop cart at operation 502.

In some cases, a drop cart and/or a cashbox data reader may not be able to obtain data from the cashbox inserted at operation 502. In these examples, the drop cart may be configured to alert a casino employee and/or send a signal to a casino system (e.g., accounting system) noting that the drop cart is unable to obtain data from the inserted cashbox. In response, a casino employee may be directed to attempt to reinsert and/or otherwise reseat the cashbox in the drop cart, may mark the cashbox for manual processing, and the like. In some cases, the drop cart may include one or more status lights or indicators to indicate whether data has been successfully obtained from the cashbox inserted at operation 502.

The method 500 also includes operation 506 in which data obtained from the cashbox inserted at operation 502 is transmitted or otherwise provided as input to a casino accounting system. The operation 506 can be performed in whole or in part across a wired communication interface (e.g., Ethernet), a wireless communication interface (e.g., Wi-Fi or Bluetooth), or using any other suitable technique. In some cases, the operation 506 may be buffered or otherwise performed at a later time, such as when the drop cart is delivered by a casino employee to a counting room. It is appreciated that the operation 506 can take place at any suitable time and may be performed in response to an instruction from an autonomous drop cart processing system, such as described herein, in response to an instruction from a casino employee, and/or in response to an instruction received from a casino accounting system.

FIG. 6 depicts example operations of a method of operating an autonomous drop cart processing system, such as described herein. These operations can be performed, in whole or in part, by a processor or other controller of an autonomous drop cart processing system, such as described herein (see, e.g., FIGS. 2A-4). In some cases, one or more operations of the method 600 can be carried out, in whole or in part, in software executed by a processor or controller of an autonomous drop cart processing system, such as described herein.

The method 600 includes operation 602 in which a cashbox stored on a drop cart being processed by the autonomous drop cart processing system is selected. In some cases, an entire row of cashboxes can be selected.

Next, at operation 604, an access control robot can be positioned by a controller of the autonomous drop cart processing system based on a known position and/or location the selected cashbox or row. In some examples, such as described above, the access control robot can be a Cartesian coordinate robot configured to position a key attachment within a lock of the selected cashbox (or, alternatively, a set of key attachments, each fitted into a respective one cashbox of a row or other grouping of cashboxes).

Next, at operation 606, the access control robot can be instructed to unlock one or more of the cashboxes selected at operation 602. The access control robot can be further configured to open an unlocked door of each of the cashboxes selected at operation 602.

Next at operation 608, a document processing robot can be positioned by a controller of the autonomous drop cart processing system based on a known position and/or location the selected cashbox or row. In some examples, such as described above, the document processing robot can be an articulated joint robot or a delta robot configured to position a grasping attachment within a cavity of each of the cashboxes unlocked at operation 606.

Next, at operation 610, the document processing robot can be positioned by a controller of the autonomous drop cart processing system to extract a stack of documents from the cavity of each of the cashboxes unlocked at operation 606.

Finally, at operation 612, the access control robot can be repositioned by a controller of the autonomous drop cart processing system based on a known position and/or location the selected cashbox or row. Thereafter, the access control robot can be used to close the door(s) of each selected cashbox and to lock the doors of each selected cashbox.

The method 600 can, in some examples, thereafter advance back to operation 602 in which another cashbox or another row of cashboxes can be selected. Thereafter, the various operations of method 600 described above can be performed again.

FIG. 7 depicts example operations of a method of operating an autonomous drop cart processing system, such as described herein. As with other method embodiments described herein, the method 700 can be performed in whole or in part by a controller of an autonomous drop cart processing system.

The method 700 includes operation 702 in which a set of documents extracted (e.g., by a document processing robot) can be placed in a document jogger. Optionally, at operation 704, one or more identification or placement cards can be inserted into the document stack, onto the document stack, or below the document stack, such as a header card or a trailer card. Thereafter, at operation 706, the document jogger can be activated. Once the documents in the document stack are jogged, the jogged stack of documents can be appropriately moved to any other suitable system, such as but not limited to: a currency counter; a currency bundler or binder; a document sorter; and the like.

The foregoing embodiments depicted in the figures referenced above and the various alternatives thereof and variations thereto are presented, generally, for purposes of explanation, and to facilitate an understanding of various configurations and constructions of a network architecture that facilitates communication by and between various components of an autonomous drop cart processing system, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein—including private financial data—will preferably comply with published and industry-established privacy, data, and network security policies and practices. For example, it is understood that data and/or information obtained from remote or local data sources—only on informed consent of the subject of that data and/or information—should be accessed aggregated only for legitimate, agreed-upon, and reasonable uses.

The invention claimed is:

1. An automated system, comprising:
a first automation mechanism supported by a frame, said first automation mechanism configured to translate in linear and vertical directions, said first automation mechanism further configured to manipulate and reposition a key extension to unlock and open each cashbox on one side of a drop cart proximate thereto; and
a second automation mechanism including a movable mechanical arm configured to position a grasping attachment coupled to said movable mechanical arm to extract a stack of documents from each unlocked cashbox with an open door.

2. The automated system of claim 1, further comprising a processor configured to instruct an electronic gaming machine cashbox to clear data from a storage medium after said stack of documents is removed from said electronic gaming machine cashbox.

3. The automated system of claim 2, wherein said processor is configured to obtain said data upon insertion of the electronic gaming machine cashbox into a drop cart compartment.

4. The automated system of claim 2, wherein said processor is configured to provide an alert that said processor is unable to obtain the data.

5. The automated system of claim 2, wherein said processor is configured to provide an alert that said stack of documents was not removed from said electronic gaming machine cashbox.

6. An automated system, comprising:
a drop cart including a housing frame defining a plurality of cashbox compartments;
a first automation mechanism supported by a frame, said first automation mechanism configured to translate in linear and vertical directions, said first automation mechanism further configured to manipulate and reposition a key extension to unlock and open each cashbox on one side of said drop cart when proximate thereto; and
a second automation mechanism including a movable mechanical arm configured to position a grasping attachment coupled to said movable mechanical arm to extract a stack of documents from each unlocked cashbox with an open door.

7. The automated system of claim 6 further comprising a cashbox data receiver on said drop cart and configured to communicably couple with a cashbox data receivers of electronic gaming machine cashboxes positioned in said plurality of compartments.

8. The automated system of claim 7 further comprising a communication component and processor configured to:
obtain data, from said cashbox data receiver, corresponding to a stack of documents contained by said electronic gaming machine cashbox; and
provide the data to an electronic device via the communication component.

9. The automated system of claim 8, wherein said processor is configured to provide said data upon insertion of an electronic gaming machine cashbox into one of said plurality of compartments.

10. The automated system of claim 8, wherein said processor provides said data to a casino accounting system.

11. An automated system, comprising:
a first automation mechanism supported by a frame, said first automation mechanism configured to translate in linear and vertical directions, said first automation mechanism further configured to manipulate and reposition a key extension to unlock and open each cashbox on one side of a drop cart proximate thereto;
a second automation mechanism including a movable mechanical arm configured to position a grasping attachment coupled to said movable mechanical arm to extract a stack of documents from each unlocked cashbox with an open door; and
a collection station for receiving said stack of documents from each unlocked cashbox.

12. The automated system of claim 11 wherein said collection station includes one or more of a currency counter, a currency bundler or binder and a document sorter.

13. The automated system of claim 11 further comprising a drop cart.

14. The automated system of claim 13, wherein said drop box comprises:
- a housing frame that defines a compartment;
- a cashbox data receiver configured to communicably couple with a cashbox data receiver of an electronic gaming machine cashbox positioned in said compartment in order to obtain data corresponding to said stack of documents contained by said electronic gaming machine cashbox; and
- a movement mechanism that allows movement of the housing frame.

15. The automated system of claim 14, wherein said movement mechanism is powered.

16. The automated system of claim 14 wherein said drop cart includes a locking mechanism operable to secure an electronic gaming machine cashbox to said housing frame.

17. The automated system of claim 16, wherein said locking mechanism comprises an electromechanical locking mechanism.

18. The automated system of claim 16, further comprising a drop cart power source wherein said locking mechanism is operable while said power source is disconnected.

19. The automated system of claim 16, further comprising a drop cart processor operable to determine an error condition regarding said electronic gaming machine cashbox.

20. The automated system of claim 16, wherein said locking mechanism comprises at least one of:
- a push-push mechanism;
- a latch mechanism; or
- a detent mechanism.

* * * * *